(No Model.)

T. S. BAYLES.
MACHINE FOR FORMING STAPLES.

No. 287,087. Patented Oct. 23, 1883.

Witnesses.  
J. B. Fetherstonhaugh  
Chas. C. Baldwin

Inventor.  
Thos. S. Bayles  
by Donald C. Ridout & Co.  
Attys.

UNITED STATES PATENT OFFICE.

THOMAS S. BAYLES, OF TORONTO, ONTARIO, CANADA.

MACHINE FOR FORMING STAPLES.

SPECIFICATION forming part of Letters Patent No. 287,087, dated October 23, 1883.

Application filed May 24, 1883. (No model.)

*To all whom it may concern:*

Be it known that I, THOMAS STUBBS BAYLES, of the city of Toronto, in the county of York, in the Province of Ontario, Dominion of Canada, have invented a certain new and useful Machine for Cutting Off and Bending Wire to Form Staples, of which the following is a specification.

The object of the invention is to produce a simple and rapidly-operating machine for cutting off and forming staples; and it consists in the peculiar construction, arrangement, and combination of parts, as hereinafter more fully described and claimed.

Figure 1:
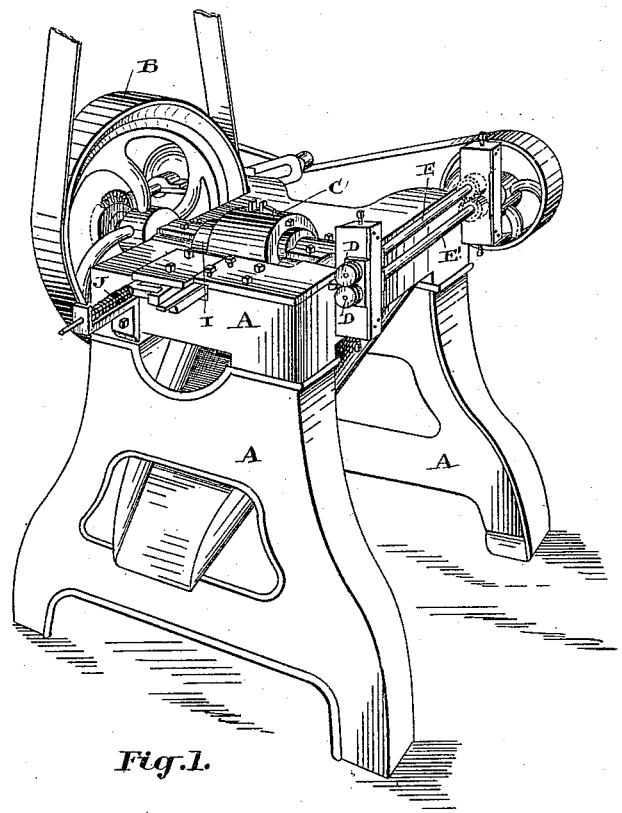
Figures 2, 3:
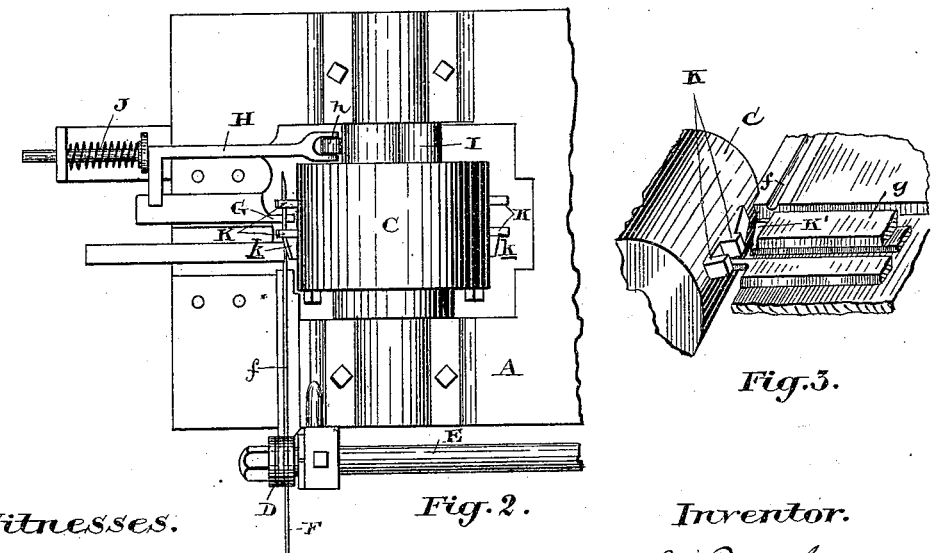

In the drawings, Figure 1 is a perspective view of the machine complete. Fig. 2 is an enlarged plan, showing the shaping and cutting-off mechanism, the cap $a$ seen in Fig. 1 being removed. Fig. 3 is a detail of cutting-off and bending mechanism.

A is the main frame of the machine, preferably made of iron, and shaped substantially as shown.

B is a driving-pulley propelled by a belt or any other means. The driving-pulley B is keyed or otherwise fastened to the same shaft as that to which the drum C is attached, so that the revolving of the pulley B imparts a corresponding movement to the drum C.

D are two rollers, keyed or otherwise fastened to the spindles E E'. The spindles E E' are driven as represented, or in any other suitable manner to cause them to revolve in opposite directions. Consequently anything placed between the rollers D will be fed through them by the action of their revolution. The rollers D are grooved, as indicated, in order to hold in position and feed the wire F. This wire F, as shown in Fig. 2, extends into the machine over a projection or finger, G. The body of this finger G is carried in a suitable bearing formed in the frame A, and is connected to the sliding bar H, carried in similar bearings. This bar H has at one end of it a friction-roller, $h$, which is pressed against the cam I by the action of the spiral spring J. The cam I is so shaped and fixed to the spindle upon which the drum C is held that immediately after the fingers or projections K on the drum C have passed the finger G the cam, by acting against the friction-roller $h$ on the sliding bar H, pushes the said sliding bar back, carrying with it the finger G. The mechanism for causing the rollers D to revolve is so timed that the wire F is so fed into the machine that at each revolution of the drum sufficient wire is fed in across the finger G to form a single staple, there being, when the machine is made as shown in the drawings, two sets of fingers or projections K attached to the drum. Of course, if there were more sets fixed in the drum, the speed at which the wire is fed in would have to be greater. Should there be only one pair of fingers K, then the speed of the feed would be correspondingly lessened.

It will be noticed on reference to Fig. 2 that on the outside of one of the projections K a cut-off knife, $k$, is placed. This cut-off knife forms a shear with the knife K', fixed to the machine, so as to cut off the wire forming the staple before it is bent into shape by the action of the formers or fingers K. It will also be noticed that the knives $k$ have angular cutting-edges designed for the purpose of shearing off the wire diagonally, so as to form a sharp point on the end of the staple.

Although I think it will be found preferable to make the finger G recede in order to permit the staple to drop off when formed, the same effect could of course be produced by attaching a push-off bar to the sliding bar H, and so setting the cam I that the push-off bar would move forward each time that the fingers K pass the finger G.

On reference to Figs. 2 and 3, it will be noticed that the wire F, as it passes from the rollers D, enters a groove, $f$, made in a strip held in the frame A of the machine. This groove $f$ conducts the wire to the top surface of the fixed knife K', where the wire is retained in position by a shoulder formed by the end of the bar $g$, which rests upon the top of the knife K'. Thus the wire is held in position during the time that it is being cut off.

What I claim as my invention is—

1. A revolving drum provided with one or more pairs of projections or formers, K, in combination with a reciprocating finger, G, carried in suitable bearings, and mechanism for reciprocating said finger, substantially as and for the purposes set forth.

2. A revolving drum provided with one or more pairs of projections or formers, K, in combination with a reciprocating finger, G, spring J, and sliding bar H, having friction-roller h, and operating said finger G, substantially as and for the purposes set forth.

3. In a staple-machine, the combination of the drum C, having on its periphery one or more pairs of projections, K, the rolls D, guide f, sliding bar H, provided with friction-roller h and carrying the reciprocating finger G, knives k and K', cam I, and spring J, all combined, arranged, and operating substantially as and for the purposes specified.

T. S. BAYLES.

Witnesses:
CHAS. C. BALDWIN,
LEWIS TOMLINSON.